Figure 4:
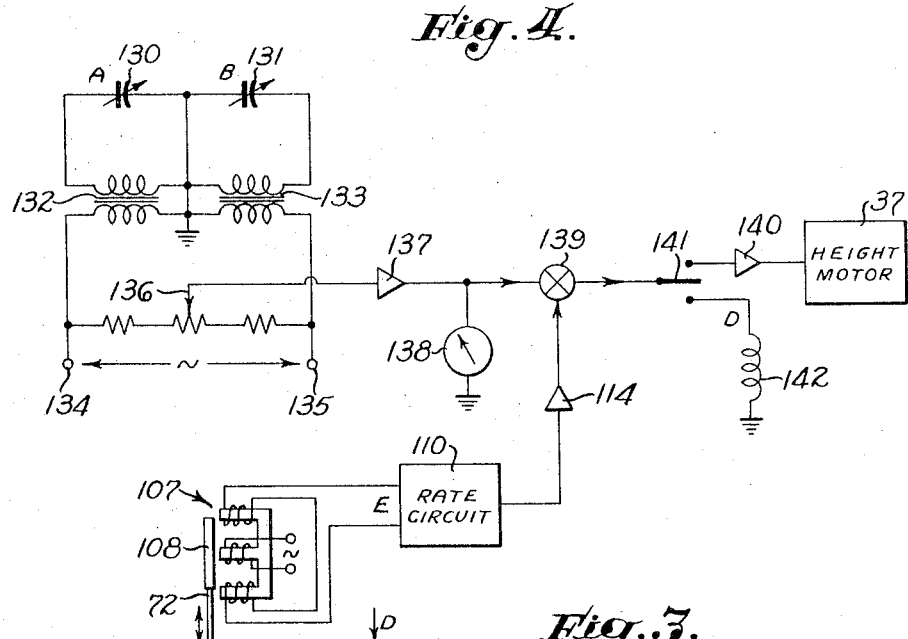

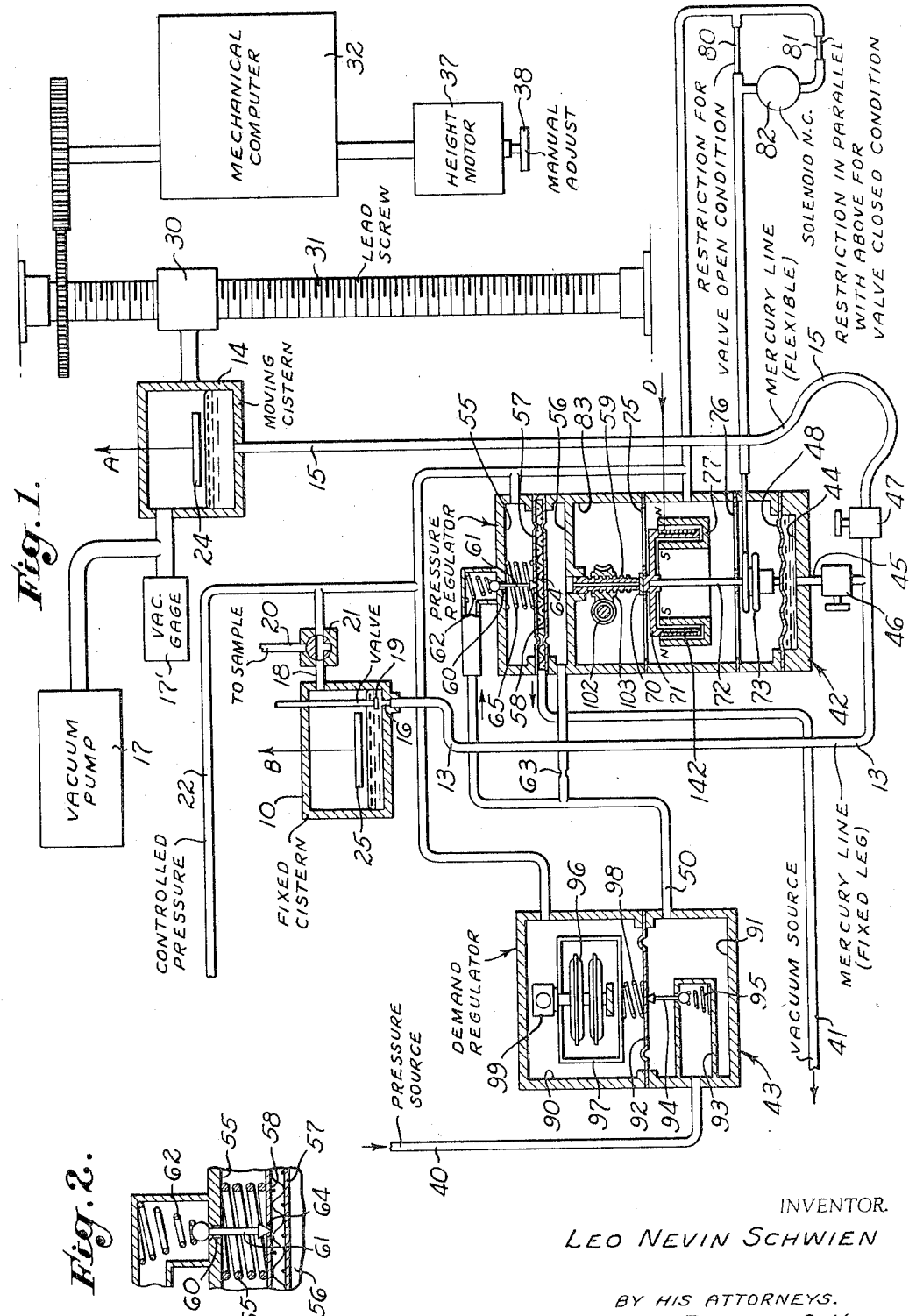

Jan. 10, 1967 L. N. SCHWIEN 3,296,867
MANOMETER
Filed Nov. 2, 1964 2 Sheets-Sheet 2

INVENTOR.
LEO NEVIN SCHWIEN

BY HIS ATTORNEYS.
HARRIS, KIECH, RUSSELL & KERN 3,296,867
MANOMETER
Leo Nevin Schwien, Los Angeles, Calif., assignor to Schwien Engineering, Inc., Los Angeles, Calif., a corporation of California
Filed Nov. 2, 1964, Ser. No. 407,969
16 Claims. (Cl. 73—401)

This invention relates to manometers and, in particular, to a mercury manometer having improved sensitivity and stability. The basic structure of the manometer utilizing interconnected mercury cisterns and cistern capacitors for determining unbalance in the system is shown in my copending application entitled "Manometer" Serial No. 252,498 filed January 18, 1963 and assigned to the same assignee as the present application, now Patent No. 3,225,599. Reference may be made to said copending application for information regarding the construction and operation of the basic instrument. The present application is directed to improvements incorporating an additional mercury chamber having a movable diaphragm or wall member for sensing system unbalance. The improvement of the present application is particularly adapted for use in providing a controlled pressure as well as providing automatic indication of change in a sample or reference pressure.

It is an object of the invention to provide a manometer of the type disclosed incorporating a chamber interconnected with first and second cisterns and having a movable wall member, drive means for supplying a variable pressure to the pressure line connected to the lower cistern, and means for generating a control signal for the drive means with the control signal varying as a function of the movement of the movable wall member and of the error signal provided from the cistern capacitor circuitry. A further object is to provide such an instrument incorporating drive means for moving one of the cisterns vertically relative to the other and means for utilizing the combination control signal for actuating the drive means to move one cistern and bring the system into balance providing an indication of the magnitude of the sample pressure.

It is a particular object of the invention to provide signal generating equipment for operation with the movable member of the new chamber utilizing a motion detection unit. An additional object is to provide rate circuitry in conjunction with the motion detection unit to produce a signal varying as the rate of travel of the movable wall member. Another object is to provide a coupling member between the movable wall member and the signal generating unit with the coupling member incorporating a bellows having a restriction coupling between the interior and exterior of the bellows.

It is a particular object of the invention to provide a controlled pressure source incorporating a valve and a drive for the valve with the valve providing an output pressure intermediate two input pressures and with the valve drive being actuated by the control signal.

It is an object of the invention to provide an alternative form incorporating a pressure regulator valve which is pneumatically energized for coarse control and which is electromagnetically controlled for fine control as a function of the system unbalance signal. A further object is to provide such a regulator system incorporating a mechanical adjustment for setting of the null value at various operating pressures.

The invention also comprises novel details of construction and novel combinations and arrangements of parts, which will more fully appear in the course of the following description. The drawings merely show and the description merely describes preferred embodiments of the present invention which are given by way of illustration or example.

Figure 3:
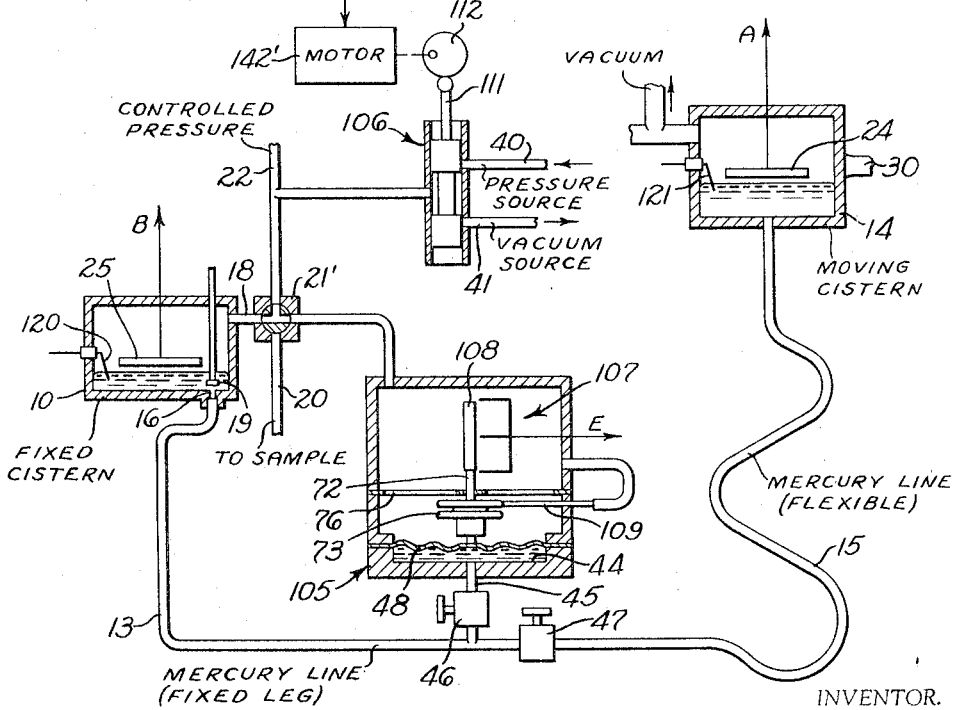

In the drawings:
FIG. 1 is a diagrammatic illustration of a preferred form of the invention;
FIG. 2 is an enlarged sectional view of a portion of the regulator of FIG. 1;
FIG. 3 is a diagrammatic illustration of an alternative form of the invention; and
FIG. 4 is an electrical schematic for the instruments of FIGS 1 and 3.

Referring to FIG. 1, the manometer incorporates a fixed cistern 10 connected to a moving cistern 14 by an interconnecting line having a flexible section 15 and a fixed section 13. The line 13, 15 is filled with mercury to provide pools in the fixed cistern 10 and in the moving cistern 14.

A low pressure source such as a vacuum pump 17 is connected to the moving cistern 14 above the mercury pool and a vacuum gauge 17' provides an indication of the pressure. Ideally the low pressure should be a perfect vacuum and in the embodiments presently being operated, the pressure is typically less than five microns. A reference pressure is connected to the fixed cistern above the mercury pool via a line 18. Means are provided for blocking mercury flow between the cisterns and typically may be positioned in the fixed cistern for closing an exit passage 16, such as the valve 19 which is raised and lowered as desired. A typical operating solenoid and cam for the valve is shown in the aforesaid copending application.

A sample pressure, which may be the atmosphere or any other pressure to be measured, is connected to the line 18 via line 20 and valve 21. A line 22 on which a controlled pressure is to be maintained may also be connected to the line 18 by the valve 21.

Unbalance in the system is sensed by a bridge circuit as disclosed in my copending application and includes a capacitor plate 24 supported on an insulator within the moving cistern 14 above the mercury pool and another capacitor plate 24 within the fixed cistern.

The moving cistern is supported on a carrier 30 driven by a lead screw 31 which in turn is driven by a motor 37 or a manually operable knob 38. The output of the motor 37 is connected to the lead screw 31 via a computer 32 which provides for various compensations and alternative inputs which are not pertinent to the present invention and which are described in my copending application.

With the valve 21 in the position shown in FIG. 1, the embodiment of FIG. 1 may be operated to provide a controlled pressure on the line 22. The desired pressure is set by operating the height motor 37 and/or the manual adjustment knob 38 to position the moving cistern 14 at an elevation which corresponds to the desired pressure. A pressure source of a magnitude greater than the desired pressure is connected on line 40 and another pressure source of a magnitude less than the desired pressure and which may be referred to as a vacuum source is connected on line 41. The pressure regulation is achieved using a pressure regulator unit 42 and a demand regulator 43 may be utilized to provide a coarse control on the high pressure source.

Referring to the unit 42, a chamber 44 is connected to the mercury line via a line 45 having a manually adjustable needle valve 46 therein. Another manually adjustable needle valve 47 is provided in the line 15. The upper surface of the chamber 44 is closed by a movable wall member, typically a metal diaphragm 48. The valve 46 is used to damp the motion of the diaphragm 48 and preferably is adjusted to a slightly underdamped condition. The valve 47 is used to damp mercury movement from the moving cistern and is adjusted to produce minimum oscillation of the mercury column.

A pneumatic pressure regulator is carried at the upper end of the unit 42 and includes a high pressure inlet line 50 from the output of the demand regulator 43, a low pressure or vacuum inlet connected to the line 41, and an output connected to the controlled pressure line 22. An upper chamber 55 is separated from a lower chamber 56 by a diaphragm 57 having a passage 58 therein, with the passage 58 connected to the low pressure line 41. Typically the diaphragm 57 may comprise two thin sheets of metal or rubber with a wire screen therebetween. A nozzle 59 provides an exhaust outlet from the chamber 56.

The high pressure line 50 is connected directly into the chamber 55 through a valve opening 60 which may be closed by a valve member 61 (FIG. 2). A spring 62 urges the valve member 61 to the downward position closing the opening 60. The high pressure line 50 is also connected to the chamber 56 via a restriction 63. Another valve opening 64 is provided in the upper plate of the diaphragm 57 with the lower end of the valve member 61 acting to close the opening 64. A spring 65 urges the diaphragm 57 away from the valve member 61. In FIG. 2, the valve member 61 is shown raised from both seats 60 and 64 although it would not be in this position during normal operation.

A control member provides for closing and opening the exhaust outlet of the nozzle 59. The control member includes a pad 70, a coil form 71, a rod 72 and a bellows 73, with the pad being engageable with the end of the nozzle 59 and with the lower end of the bellows engaging the diaphragm 48. The control member is supported by two spring elements 75, 76 permitting motion toward and away from the nozzle 59 with minimum resistance. An annular coil is wound on the coil form 71 and rides in an annular permanent magnet 77 which the coil energized from a line D. In the preferred form illustrated herein, the bellows 73 is used to provide an anticipation or rate control. The interior of the bellows 73 is connected to the exterior via a restriction 80. When the valve 19 is closed, an additional restriction 81 is connected in parallel with the restriction 80 by means of a solenoid operated valve 82. The interior area 83 of the regulator unit 42 is connected to the controlled pressure line 22.

The size of each of the restrictions 63, 80, 81 is dependent on the parameters of the particular instrument and is best determined by testing using a variable restriction to obtain optimum stability.

Referring to the demand regulator 43, an upper chamber 90 is separated from a lower chamber 91 by a diaphragm 92. Flow from an inlet chamber 93 to the chamber 91 and the outlet line 50 is controlled by a valve 94 which is urged to the normally closed position by a spring 95. A bellows 96 is fixed at its lower end to a bracket supported from the wall of the regulator. A box bracket 97 is fixed to the upper end of the bellows 96 and a compression spring 98 is positioned between the lower surface of the bracket 97 and the diaphragm 92. A stop 99 provides a limit on the upward motion of the upper end of the bellows by engaging the top wall of the regulator; the bellows may have an internal stop to limit its compression.

The bridge circuit of the instrument is shown in FIG. 4. The cisterns and the mercury column are connected to circuit ground with the pool of mercury in a cistern functioning as one plate of the capacitor therein. The pool of mercury and the plate 24 in the moving cistern 14 provide a capacitor 130 and the pool of mercury and the plate 25 in the cistern 10 provide another capacitor 131. These capacitors are coupled into a bridge circuit by impedance changing transformer 132, 133, respectively, with the bridge circuit being energized across terminals 134, 135. Typically the bridge input is one and one-half volts A.C. at one hundred kilocycles. The bridge output or error signal appears at the arm 136 of the balance potentiometer and is connected through an amplifier and demodulator 137 to an indicating meter 138. The circuit of FIG. 4 includes a summing point 139 which is not utilized with the embodiment of FIG. 1. The error signal from the amplifier 137 may be connected via a switch 141 to the coil 142 of the pressure regulator control member. In an alternate position of the switch 141, the error signal is connected through an amplifier 140 to drive the height motor 37.

The instrument of FIG. 1 may be operated to precisely maintain a desired pressure on the line 22. The valve 21 is placed in the position shown in FIG. 1 to connect the fixed cistern to the controlled pressure line. The height of the moving cistern is adjusted to the desired value. The demand regulator 43 may be used to provide a coarse control for the high pressure but is not essential to the invention described herein. The diaphragm 92 is urged downward by the controlled pressure and by the spring 98 and is urged upward by the higher pressure in the line 50. Downward movement of the diaphragm opens the valve 94 while upward movement closes the valve. The position of the upper end of the spring 98 is varied by the bellows 96 as a function of the magnitude of the controlled pressure until the controlled pressure falls below a predetermined value at which time the stop 99 engages the upper wall of the regulator.

The bellows 96 provides an approximate compensation for the non-linear effect resulting from the change in density or specific volume of air with change in absolute pressure. The effect at pressures more than 20 inches absolute is negligible and the regulator normally is adjusted so that the bellows stop leaves the limiting wall between 20 and 30 inches pressure.

In the regulator unit 42, motion of the valve 61 is controlled by the diaphragm 57. The diaphragm is urged downward by the spring 65 and by the controlled pressure acting on the upper surface. When the diaphragm moves above a predetermined position, it is also urged downward by the spring 62 acting through the valve member 61. The diaphragm is urged upward by the pressure in the chamber 56 which varies with the size of the exhaust opening at the nozzle 59. The position of the control member 72 and hence the size of the exhaust opening is controlled by the movement of the diaphragm 48 and by the magnitude of current in the coil 142. A manually rotatable worm 102 drives a gear 103 for adjusting the position of the exhaust nozzle 59. The manual adjustment may be made when the system is in balance to trim the system to the exact balance. This mechanical adjustment of the position of the exhaust nozzle is desirable because the specific volume of the air issuing from the nozzle varies with the magnitude of the desired controlled pressure.

The mercury volume in the chamber 44 varies with the unbalance between the two cisterns and thereby provides a movement of the control member 72 for varying the exhaust opening of the regulator to control the pressure at the controlled pressure line 22. The output from the capacitor bridge also varies as a function of the unbalance of the system and provides a signal for energizing the coil 142 for controlling the movement of the member 72. An anticipation or rate action in the movement of the control member 72 is provided by the bellows 73. Rate control can also be introduced in the electrical signal between the capacitor bridge and the coil 142, using conventional circuitry. With this combination of controls, it is possible to maintain very accurately the desired controlled pressure with minimum oscillation and with rapid response to disturbances and to change.

When it is desired to operate the instrument of FIG. 1 for measuring the sample pressure, the valve 21 is rotated 90° clockwise connecting the sample line 20 to the cistern inlet line 18. The switch 141 is actuated to connect the output of the bridge to the height motor 37 and the moving cistern 14 is driven up or down to produce a balance. The position of the moving cistern then provides an indication of the magnitude of the pressure at the sample line.

An alternative form of the invention is illustrated in FIG. 3 wherein elements corresponding to those of the embodiment of FIG. 1 are identified by the same reference numerals. A sensing unit 105 and a control valve 106 are utilized in place of the regulator unit 42 of FIG. 1. The demand regulator 43 has been omitted from this embodiment but could be utilized if desired. The diaphragm 48 positioned above the mercury containing chamber 44 is utilized to drive the moving member of a mechanical-to-electrical transducer 107 which may be a conventional E pickoff. An armature 108 is carried at the upper end of the rod 72 with the lower end of the rod fixed to the upper end of the bellows 73. The interior of the bellows is connected to the exterior via a restriction 109. The restriction switching circuitry of FIG. 1 may be utilized if desired. A typical E pickoff construction is shown in greater detail in FIG. 4 and includes a primary winding on the center leg and a pair of balanced secondary windings on the outer legs. With the armature 108 centered, the output from the pickoff will be zero while the output will vary in magnitude and phase as the armature is displaced to one side or the other of the central position. In the preferred embodiment illustrated, the output from the transducer 107 is provided as the input to a rate circuit 110 with the output of the rate circuit connected to the summing point 139 through an amplifier 114 for combination with the error signal from the capacitor bridge. The rate circuit 110 may be a conventional circuit which provides an output signal varying as a function of the rate of change of the input signal. Of course, a combination of magnitude or position and rate signals may be utilized from the transducer 107 to the mixing point. In one embodiment a series capacitance may be used to provide the rate signal and the capacitance may be shorted by a relay directly or through a resistor to provide a position signal when the valve 19 is closed.

The moving member 111 of the valve 106 is controlled by a motor 142' driving a cam 112. The control signal from the mixing point 139 is connected to the switch 141 to drive the motor 142' through a power amplifier 115 in the same manner that it drives the coil 142 of the embodiment of FIG. 1.

An electrically conducting probe 120 may be mounted in the wall of the cistern 10 in an insulating bushing with the end of the probe normally contacting the mercury pool. Another probe 121 may be similarly mounted in the cistern 14. The two probes may be connected in series between the mercury, the solenoid for the valve 19, and the power source for the solenoid to provide a safety circuit which closes the valve 19 whenever the mercury in a cistern falls below a predetermined level.

The apparatus of FIG. 3 may also be utilized to measure the magnitude of pressure at the sample line 20. For this mode of operation, the valve 21' is turned 180° interconnecting the sample line 20, the fixed cistern and the sensing unit 105, and the switch 141 is moved to connect the output signal to the input of the amplifier 140 for the height motor 37.

The various embodiments described and illustrated herein provide a new and improved apparatus for maintaining balance in a mercury manometer utilizing a combination of the error signal produced at the two cisterns due to system unbalance and the error signal produced at a mercury chamber. Mechanical, electrical and electromechanical signals are utilized in the various embodiments. Balance is maintained by varying the differential pressure supplied to the cisterns to match a preset reference or by varying the reference to match an unknown differential.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a manometer having interconnected first and second cisterns carrying pools of mercury with one of said cisterns disposed vertically relative to the other, a first pressure source connected to the upper cistern above the pool, a pressure line connected to the lower cistern above the pool, and means for generating an error signal varying as a function of unbalance at the first and second cisterns, the improvement comprising:
   a chamber interconnected with said first and second cisterns and having a movable wall member;
   pressure regulator means having a pair of inputs and an output;
   means for coupling said regulator means output to said pressure line;
   means for coupling a second pressure source of a magnitude greater than the desired line pressure to one of said regulator means inputs;
   means for coupling a third pressure source of a magnitude less than the desired line pressure to the other of said regulator means inputs;
   control means for operating said pressure regulator means for varying the output thereof; and
   means for actuating said control means as a function of movement of said movable wall member and of said error signal.

2. In a manometer having interconnected first and second cisterns carrying pools of mercury with one of said cisterns disposed vertically relative to the other, a first pressure source connected to the upper cistern above the pool, a pressure line connected to the lower cistern above the pool, and means for generating an error signal varying as a function of unbalance at the first and second cisterns, the improvement comprising:
   a chamber interconnected with said first and second cisterns and having a movable wall member;
   pressure regulator means having a pair of inputs and an output;
   means for coupling said regulator means output to said pressure line;
   means for coupling a second pressure source of a magnitude greater than the desired line pressure to one of said regulator means inputs;
   means for coupling a third pressure source of a magnitude less than the desired line pressure to the other of said regulator means inputs;
   control means for operating said pressure regulator means for varying the output thereof;
   a coupling member driven by said movable wall member and having a bellows element with its exterior exposed to said regulator means output and its interior coupled to said regulator means output via a restriction; and
   means for actuating said control means as a function of movement of said coupling member and of said error signal.

3. A manometer having interconnected first and second cisterns carrying pools of mercury with one of said cisterns disposed vertically relative to the other, a first pressure source connected to the upper cistern above the pool, a pressure line connected to the lower cistern above the pool, and means for generating an error signal varying as a function of unbalance at the first and second cisterns, the improvement comprising:
   a chamber interconnected with said first and second cisterns and having a movable wall member;

pressure regulator means having a pair of inputs and an output;

means for coupling said regulator means output to said pressure line;

means for coupling a second pressure source of a magnitude greater than the desired line pressure to one of said regulator means inputs;

means for coupling a third pressure source of a magnitude less than the desired line pressure to the other of said regulator means inputs;

control means for operating said pressure regulator means for varying the output thereof;

means for generating another error signal varying as a function of movement of said movable wall member;

means for generating a rate signal varying as the rate of change of said other error signals; and means for actuating said control means as a function of the first of said error signals and said rate signal.

4. In a manometer having interconnected first and second cisterns carrying pools of mercury with one of said cisterns disposed vertically relative to the other, a first pressure source connected to the upper cistern above the pool, a pressure line connected to the lower cistern above the pool, and means for generating an error signal varying as a function of unbalance at the first and second cisterns, the improvement comprising:

a chamber interconnected with said first and second cisterns and having a movable wall member;

a pressure regulator valve having a pair of inputs and an output;

means for coupling said regulator valve output to said pressure line;

means for coupling a second pressure source of a magnitude greater than the desired line pressure to one of said regulator valve inputs;

means for coupling a third pressure source of a magnitude less than the desired line pressure to the other of said regulator valve inputs;

electrical drive means for operating said pressure regulator valve for varying the output thereof; and means for actuating said drive means as a function of movement of said movable wall member and of said error signal.

5. In a manometer having interconnected first and second cisterns carrying pools of mercury with one of said cisterns disposed vertically relative to the other, a first pressure source connected to the upper cistern above the pool, a pressure line connected to the lower cistern above the pool, and means for generating an error signal varying as a function of unbalance at the first and second cisterns, the improvement comprising:

a chamber interconnected with said first and second cisterns and having a movable wall member;

a pressure regulator valve having a pair of inputs and an output;

means for coupling said regulator valve output to said pressure line;

means for coupling a second pressure source of a magnitude greater than the desired line pressure to one of said regulator valve inputs;

means for coupling a third pressure source of a magnitude less than the desired line pressure to the other of said regulator valve inputs;

electrical drive means for operating said pressure regulator valve for varying the output thereof;

means for generating another error signal varying as a function of movement of said movable wall member; and means for combining said error signals to provide a resultant signal for actuating said drive means for maintaining the pressure at the pressure line substantially constant.

6. In a manometer having interconnected first and second cisterns carrying pools of mercury with one of said cisterns disposed vertically relative to the other, a first pressure source connected to the upper cistern above the pool, a pressure line connected to the lower cistern above the pool, and means for generating an error signal varying as a function of unbalance at the first and second cisterns, the improvement comprising:

a chamber interconnected with said first and second cisterns and having a movable wall member;

a pressure regulator valve having a pair of inputs and an output;

means for coupling said regulator valve output to said pressure line;

means for coupling a second pressure source of a magnitude greater than the desired line pressure to one of said regulator valve inputs;

means for coupling a third pressure source of a magnitude less than the desired line pressure to the other of said regulator valve inputs;

electrical drive means for operating said pressure regulator valve for varying the output thereof;

means for generating a rate signal varying as a function of the rate of change of position of said movable wall member; and means for combining said error signal and said rate signal providing a resultant signal for actuating said drive means for maintaining the pressure at the pressure line substantially constant.

7. In a manometer having interconnected first and second cisterns carrying pools of mercury with one of said cisterns disposed vertically relative to the other, a first pressure source connected to the upper cistern above the pool, a pressure line connected to the lower cistern above the pool, and means for generating an error signal varying as a function of unbalance at the first and second cisterns, the improvement comprising:

a chamber interconnected with said first and second cisterns and having a movable wall member;

a pressure regulator valve having a pair of inputs and an output;

means for coupling said regulator valve output to said pressure line;

means for coupling a second pressure source of a magnitude greater than the desired line pressure to one of said regulator valve inputs;

means for coupling a third pressure source of a magnitude less than the desired line pressure to the other of said regulator valve inputs;

electrical drive means for operating said pressure regulator valve for varying the output thereof;

a coupling member driven by said movable wall member and having a bellows element with its exterior exposed to said regulator valve output and its interior coupled to said valve output via a restriction;

means for generating another signal varying as a function of the movement of said coupling member; and means for combining said error signal and said other signal providing a resultant signal for actuating said drive means for maintaining the pressure at the pressure line substantially constant.

8. In a manometer having interconnected first and second cisterns carrying pools of mercury with one of said cisterns disposed vertically relative to the other, a first pressure source connected to the upper cistern above the pool, a pressure line connected to the lower cistern above the pool, and means for generating an error signal varying as a function of unbalance at the first and second cisterns, the improvement comprising:

a chamber interconnected with said first and second cisterns and having a movable wall member;

first drive means for moving one of said cisterns vertically relative to the other;

second drive means for supplying a variable pressure to said pressure line; and means for generating a control signal for said drive means with said control signal varying as a function of movement of said movable wall member and of said error signal.

9. In a manometer having interconnected first and second cisterns carrying pools of mercury with one of said cisterns disposed vertically relative to the other, a first pressure source connected to the upper cistern above the pool, a pressure line connected to the lower cistern above the pool, and means for generating an error signal varying as a function of unbalance at the first and second cisterns, the improvement comprising:
 a chamber interconnected with said first and second cisterns and having a movable wall member;
 pressure regulator means having a pair of inputs and an output and an exhaust outlet;
 means for coupling said regulator means output to said pressure line;
 means for coupling a second pressure source of a magnitude greater than the desired line pressure to one of said regulator means inputs;
 means for coupling a third pressure source of a magnitude less than the desired line pressure to the other of said regulator means inputs;
 control means for varying the opening at said exhaust outlet of said pressure regulator means for varying the output thereof; and
 means for coupling said regulator valve output to said of movement of said movable wall member and of said error signal.

10. In a manometer having interconnected first and second cisterns carrying pools of mercury with one of said cisterns disposed vertically relative to the other, a first pressure source connected to the upper cistern above the pool, a pressure line connected to the lower cistern above the pool, and means for generating an error signal varying as a function of unbalance at the first and second cisterns, the improvement comprising:
 a chamber interconnected with said first and second cisterns and having a movable wall member;
 pressure regulator means having a pair of inputs and an output and an exhaust outlet;
 means for coupling said regulator means output to said pressure line;
 means for coupling a second pressure source of a magnitude greater than the desired line pressure to one of said regulator means inputs;
 means for coupling a third pressure source of a magnitude less than the desired line pressure to the other of said regulator means inputs;
 a movable control member positioned at said exhaust outlet for varying the opening thereof and the output of said pressure regulator means;
 means for driving said control member by said movable wall member; and
 electromagnetic means for driving said control member as a function of said error signal.

11. An apparatus as defined in claim 10 in which said means for driving said control member includes a bellows element with its exterior exposed to said regulator means output and its interior coupled to said regulator means output via a restriction.

12. An apparatus as defined in claim 10 in which said pressure regulator means includes:
 means defining first and second chambers separated by a diaphragm having an interior passage communicating with said first chamber at a first valve seat,
 with the higher second pressure source coupled to said first chamber at a second valve seat and to said second chamber via a restriction and with the lower third pressure source coupled to said interior passage and with said regulator means output from said first chamber and with said exhaust outlet from said second chamber,
 a valve member engageable with said first and second valve seats,
 spring means urging said valve member toward said second seat, and
 spring means urging said diaphragm and first valve seat away from said valve member, with said diaphragm engageable with said valve member to move said valve member away from said second valve seat.

13. In a manometer having interconnected first and second cisterns carrying pools of mercury with one of said cisterns disposed vertically relative to the other, a first pressure source connected to the upper cistern above the pool, a pressure line connected to the lower cistern above the pool, and means for generating an error signal varying as a function of unbalance at the first and second cisterns, the improvement comprising:
 a chamber interconnected with said first and second cisterns and having a movable wall member;
 a pressure regulator valve having a pair of inputs and an output;
 means for coupling said regulator valve output to said pressure line;
 means for coupling a second pressure source of a magnitude greater than the desired line pressure to one of said regulator valve inputs;
 means for coupling a third pressure source of a magnitude less than the desired line pressure to the other of said regulator valve inputs;
 first drive means for moving one of said cisterns vertically relative to the other;
 second drive means for operating said pressure regulator valve for varying the output thereof; and
 means for selectively actuating said drive means as a function of movement of said movable wall member and of said error signal.

14. In a manometer having interconnected first and second cisterns carrying pools of mercury with one of said cisterns disposed vertically relative to the other, a first pressure source connected to the upper cistern above the pool, a pressure line connected to the lower cistern above the pool, and means for generating an error signal varying as a function of unbalance at the first and second cisterns, the improvement comprising:
 a chamber interconnected with said first and second cisterns and having a movable wall member;
 drive means for moving one of said cisterns vertically relative to the other; and
 means for generating a control signal for energizing said drive means with said control signal varying as a function of the movement of said movable wall member and of said error signal.

15. In a manometer having interconnected first and second cisterns carrying pools of mercury with one of said cisterns disposed vertically relative to the other, a first pressure source connected to the upper cistern above the pool, a pressure line connected to the lower cistern above the pool, and means for generating an error signal vaying as a function of unbalance at the first and second cisterns, the improvement comprising:
 a chamber interconnected with said first and second cisterns and having a movable wall member;
 first drive means for moving one of said cisterns vertically relative to the other;
 second drive means for supplying a variable pressure to said pressure line;
 means for generating a control signal for said drive means with said control signal varying as a function of movement of said movable wall member and of said error signal;
 a valve and solenoid for opening and closing the connection between said cisterns; and
 means for controlling said valve including an electrical conductor positioned in each cistern and normally contacting the mercury therein, with said conductors connected in series with said solenoid.

16. In a manometer having interconnected first and second cisterns carrying pools of mercury with one of said cisterns disposed vertically relative to the other, a first pressure source connected to the upper cistern above the pool, a pressure line connected to the lower cistern above the pool, and means for generating an error signal varying as a function of unbalance at the first and second cisterns, the improvement comprising:
- a chamber interconnected with said first and second cisterns and having a movable wall member;
- first pressure regulator means having a pair of inputs and output;
- means for coupling said first regulator means output to said pressure line;
- second pressure regulator means having an input, an output and a reference line, with the output thereof varying as a function of the absolute value of the pressure at said reference line;
- means for coupling a second pressure source of a magnitude greater than the desired line pressure to said second regulator means input;
- means for coupling said second regulator means output to one of said first regulator means inputs;
- means for coupling said second regulator means reference line to said pressure line;
- means for coupling a third pressure source of a magnitude less than the desired line pressure to the other of said first regulator means inputs;
- control means for operating said first pressure regulator means for varying the output thereof; and
- means for actuating said control means as a function of movement of said movable wall member and of said error signal.

References Cited by the Examiner

UNITED STATES PATENTS 3,134,262  5/1964  Dworzan et al. _____ 73—401

LOUIS R. PRINCE, *Primary Examiner.*

UNITED STATES PATENT OFFICE
CERTIFICATE OF CORRECTION

Patent No. 3,296,867 January 10, 1967

Leo Nevin Schwien

It is hereby certified that error appears in the above numbered patent requiring correction and that the said Letters Patent should read as corrected below.

Column 1, line 47, before "member" insert -- wall --; column 2, line 43, for "plate 24" read -- plate 25 --; column 3, line 40, for "which" read -- with --; column 6, line 66, for "A manometer" read -- In a manometer --; column 9, lines 24, 25 and 26, strike out "means for coupling said regulator valve output to said of movement of said movable wall member and of said error signal" and insert instead -- means for actuating said control means as a function of movement of said movable wall member and of said error signal --; column 10, line 52, for "vaying" read -- varying --; column 11, line 6, for "and output;" read -- and an output; --.

Signed and sealed this 26th day of September 1967.

(SEAL)
Attest:

ERNEST W. SWIDER
Attesting Officer

EDWARD J. BRENNER
Commissioner of Patents